Figure 1:
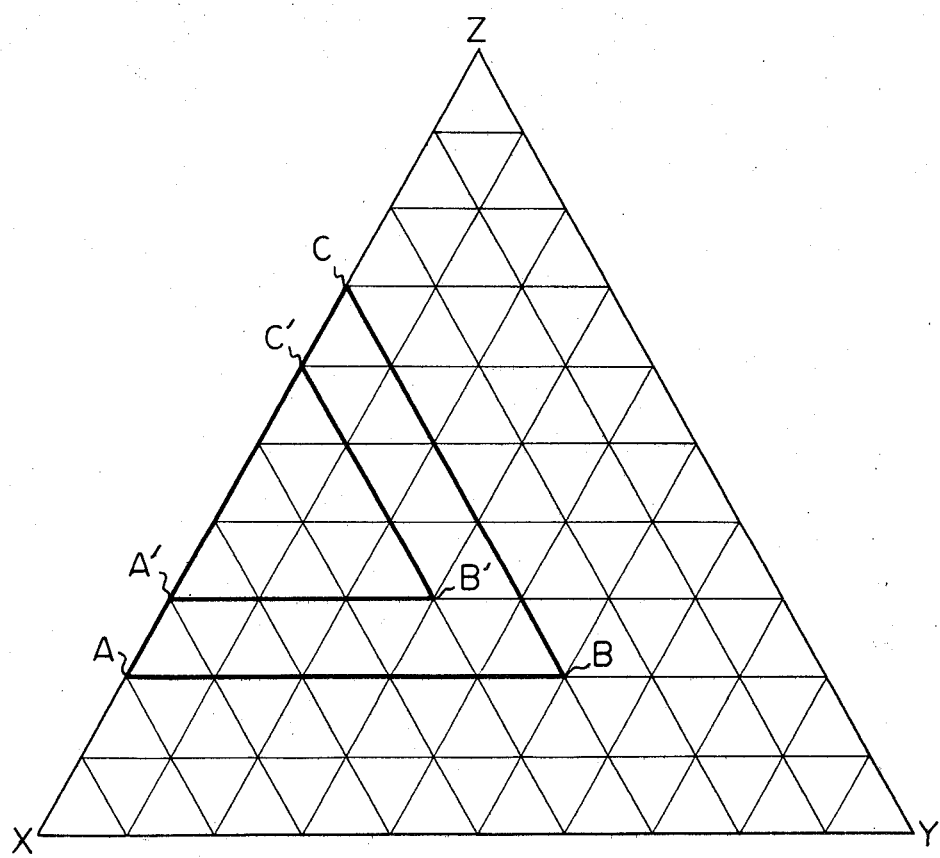

United States Patent [19]

Kataoka et al.

[11] 4,398,000

[45] Aug. 9, 1983

[54] GOLF BALL

[75] Inventors: Nobuyuki Kataoka, Hidakamachi; Tasuku Saito, Tokorozawa; Tsutomu Matsunaga, Iruma; Chiaki Tanaka, Chita; Yoko Furuta; Nagayoshi Naito, both of Nagoya, all of Japan

[73] Assignees: Bridgestone Tire Co., Ltd.; Toray Industries, Inc., both of Japan

[21] Appl. No.: 291,046

[22] Filed: Aug. 7, 1981

[30] Foreign Application Priority Data

Aug. 13, 1980 [JP] Japan ................ 55-110369

[51] Int. Cl.$^3$ .............. C08F 283/00; C08F 283/02; C08G 63/76; C08L 67/00
[52] U.S. Cl. ..................... 525/437; 273/235 R; 523/205; 523/206; 523/221; 523/223; 525/902; 528/272; 528/300; 528/302; 528/308.6
[58] Field of Search ............ 528/272, 309, 300, 302, 528/308.6; 525/437, 902; 523/205, 206, 221, 223; 273/235 R

[56] References Cited

U.S. PATENT DOCUMENTS

| | | | |
|---|---|---|---|
| 4,031,165 | 6/1977 | Saiki et al. | 525/437 |
| 4,119,607 | 10/1978 | Gergen et al. | 525/437 |
| 4,251,652 | 2/1981 | Tanaka et al. | 525/437 |
| 4,280,948 | 7/1981 | Dieck | 525/437 |

FOREIGN PATENT DOCUMENTS 1567877 5/1969 France.
2064339 6/1981 United Kingdom.

OTHER PUBLICATIONS

C.A. vol. 71, 1969, p. 81, pp 125760v.

*Primary Examiner*—Lucille M. Phynes
*Attorney, Agent, or Firm*—Austin R. Miller

[57] ABSTRACT

A solid type golf ball comprising a central core and an outer cover for the core and having an excellent flight performance and durability and acceptable "click" characteristics is presented. The main component of the outer cover of this golf ball is a polyetherester block copolymer containing the following X, Y and Z units:

X: Butylene terephthalate unit
Y: Ester unit other than butylene terephthalate
Z: Polyetherester unit derived from a dicarboxylic acid component containing terephthalic acid and poly(alkylene oxide) glycol having a number average molecular weight of 400 through 3000, wherein the X, Y and Z units are present in the following amounts:

30% by weight $\leq X \leq$ 80% by weight
0% by weight $\leq Y \leq$ 50% by weight
20% by weight $\leq Z \leq$ 70% by weight.

4 Claims, 1 Drawing Figure

GOLF BALL

The present invention relates to a multi-piece solid type golf ball and, more specifically, it relates to a multi-piece solid type golf ball in which a material containing, as a main component, polyetherester block copolymer having a particular structure is used as an outer cover of the solid type golf ball comprising one or more pieces.

Golf balls are generally classified into two main types from their structures, i.e. thread-wound type balls and solid type balls. The thread-wound type balls are mainly used as high grade balls in tournaments. Contrary to this, since the solid type balls can be manufactured at low cost and have excellent durability, the solid type balls are conventionally used as practice golf balls.

However, recently, since the flight performance of the solid type golf balls has been improved due to the improvement in elastomers used in their manufacture and the improvement in their technical design (e.g. the use of the two or three piece ball), the solid type golf balls have also been used in tournaments. Especially, in the case of two-piece balls, since various characteristics required in golf balls can be separately alloted to the central core and the outer cover, respectively, the freedom of design is increased and golf balls having an excellent flight performance, as compared with the conventional one-piece ball, can be manufactured.

However, although the use of two pieces in the solid type golf balls results in the remarkable increase in the flight performance of these golf balls, there is a problem in that so-called "click" characteristics (i.e. the qualitative feeling when the ball is hit by a club) are too sharp, as compared with the highgrade thread-wound golf balls. The conventional two-piece solid type golf balls generally comprise a central core made of materials having a relatively low modulus and having a high impact resilience and an outer cover having an extremely high modulus and made of metallic salts of copolymers of ethylene and $\alpha,\beta$-unsaturated carboxylic acids, that is, so-called ionomers. Thus, the necessary hardness of golf balls is satisfied. The deformation amount of these two-piece solid type golf balls is smaller than that of the conventional one-piece solid type golf balls due to the hardness of the outer cover and, as a result, the resilient properties of the balls are remarkably increased. Therefore, the "click" characteristics of the two-piece solid type golf balls having the above-mentioned becomes too sharp, although the resilient properties of the balls are excellent.

On the other hand, in the case where trans-1,4-polyisoprene, such as balata or gutta-percha, is used as an outer cover to improve the "click" characteristics, the resilient properties of the balls are undesirably decreased, although the "click" characteristics are remarkably improved, and the resultant golf balls are not attractive.

Accordingly, an object of the present invention is to obviate the afore-mentioned problems of the conventional solid type golf balls and to provide an improved multi-piece solid type golf ball having an excellent flight performance and durability, as compared with the known multi-piece solid type golf balls, and having hitting feeling and "click" characteristics near to that of the conventional thread-wound type golf balls.

Other objects and disadvantages of the present invention will be apparent from the following description.

In accordance with the present invention, there is provided a golf ball comprising a central core and an outer cover for the core, the main component of the outer cover being at least one polyetherester block copolymer containing the following X, Y and Z units:

X: Butylene terephthalate unit
Y: Ester unit other than butylene terephthalate
Z: Polyetherester unit derived from a dicarboxylic acid component containing terephthalic acid and poly (alkylene oxide) glycol having a number average molecular weight of 400 through 3000, wherein the X, Y, and Z units are present in the following amounts:

30% by weight $\leq X \leq$ 80% by weight
0% by weight $\leq Y \leq$ 50% by weight
20% by weight $\leq Z \leq$ 70% by weight.

The present invention will now be better understood from the description set forth below with reference to the accompanying drawing of FIG. 1, which is a triangular diagram illustrating the composition of the polyetherester block copolymers which can be used, as an outer cover material, in the present invention. The composition of the polyetherester block copolymers used in the present invention is within the area enclosed by the lines AB, BC and CA, preferably the lines A'B', B'C' and C'A'.

That is the polyetherester block copolymers used in the present invention contain a polyester hard segment (X, Y) comprising a butylene terephthalate unit (X) derived from a terephthalic acid component and a 1,4-butanediol component, and an ester, other than butylene terephthalate, unit (Y) and a polyetherester soft segment (Z) derived from a dicarboxylic acid component containing terephthalic acid and poly(alkylene oxide) glycol having a number average molecular weight of 400 through 3000. The composition on the line CA in FIG. 1 means that no unit Y is included in the polyetherester block copolymers.

The polyester hard segments (X, Y) used in the present invention are polymer units which are composed of (i) terephthalic acid or the ester-forming derivatives thereof, (ii) 1,4-butanediol or the ester-forming derivatives thereof and (iii) dicarboxylic acids other than terephthalic acid or short-chain diols having a molecular weight of 300 or less other than 1,4-butanediol, or the ester-forming derivatives thereof. These polyester hard segments (X, Y) should contain, as an essential constituent, the terephthalic acid component and the 1,4-butanediol component. However, in addition to the above-mentioned essential constituents, the polyester hard segments (X, Y) can also include the other dicarboxylic acid and/or diol components.

Examples of dicarboxylic acids other than terephthalic acid are: aromatic dicarboxylic acids such as isophthalic acid, phthalic acid, naphthalene-2,6-dicarboxylic acid, naphthalene-2,7-dicarboxylic acid, naphthalene-1,5-dicarboxylic acid, diphenyl-4,4'-dicarboxylic acid, diphenoxyethane dicarboxylic acid, 3-sodium sulfoisophthalic acid and the like; alicyclic dicarboxylic acids such as 1,4-cyclohexane dicarboxylic acid and the like; aliphatic dicarboxylic acids such as succinic acid, oxalic acid, adipic acid, sebacic acid, decane dicarboxylic acid, dimer acid and the like. It should be noted that the ester-forming derivatives of the dicarboxylic acids, for example, the lower-alkyl esters, the aryl esters, the carbonates and the acid chlorides can be equally used, in addition to or in lieu of the above-mentioned dicarboxylic acids other than terephthalic acid. These dicarboxylic acids and the derivatives thereof can be used alone or in any mixture thereof.

Examples of the diols other than 1,4-butanediol are: aliphatic diols such as ethylene glycol, propane diol, pentane diol, neopentyl glycol, 1,6-hexanediol, decamethylene glycol and the like; alicyclic diols such as 1,1-cyclohexane dimethanol, 1,4-cyclohexane dimethanol, tricyclodecane dimethanol, tricyclodecane dimethanol and the like; diols containing an aromatic group such as xylylene glycol, bis(p-hydroxy) diphenyl, bis(p-hydroxyphenyl) propane, 2,2-bis[4-(2-hydroxyethoxy)phenyl]sulfone, 1,1-bis[4-(2-hydroxyethoxy)phenyl] cyclohexane and the like can be used. These diols can also be used in the form of ester-forming derivatives thereof, such as the acetyl derivatives, the alkali metal salts and the like. These diols and the derivatives thereof can be used alone or in any mixture thereof.

The polyetherester soft segments (Z) used in the present invention are those which are composed of (i) a dicarboxylic acid component containing terephthalic acid as used in the above-mentioned hard segment and (ii) poly(alkylene oxide) glycol having a number-average molecular weight of about 400 through about 3000. Examples of poly(alkylene oxide) glycols are polyethylene glycol, poly(1,2- and 1,3-propylene oxide) glycol, poly(tetramethylene oxide) glycol, poly(hexamethylene oxide) glycol, a copolymer of ethlene oxide and propylene oxide, a copolymer of ethylene oxide and tetrahydrofuran and the like. These poly(alkylene oxide) glycols can be used alone or in any mixture thereof. Of these poly(alkylene oxide) glycols, the use of poly(tetramethylene oxide) glycol is most preferable, especially, in view of the impact resilience, the mechanical strengths (durability), the moldability and the like.

The number-average molecular weight of the poly(alkylene oxide) glycol should be about 400 through about 3000, preferably about 500 through about 2500. In the case where the molecular weight of the poly(alkylene oxide) glycol is too large, the elastic recovery (or the impact resilience) of the polyetherester block copolymers is impaired and the compatibility thereof with the polyester hard segment becomes worse due to the fact that the poly(alkylene oxide) glycol units themselves become crystallizable. Contrary to this, also in the case where the molecular weight of the poly(alkylene oxide) glycol is less than about 400, the elastic recovery of the polyetherester block copolymers is impaired since the length of the polyester block (i.e. the hard segment) is necessarily shortened.

The content of the polyetherester soft segment (Z) in the total weight of the polyetherester block copolymer should be within the range of 20 through 70% by weight, preferably 30 through 60% by weight. In the case where the polyetherester block copolymer is used as an outer cover material for golf balls, the polyetherester block copolymer should have an excellent impact resilience and a high impact fracture energy in order to impart excellent flight performance and high impact resistance to the golf balls. These properties should be mainly included in the polyetherester soft segment of the polyetherester block copolymer. For this reason, the content of the polyetherester soft segment in the polyetherester block copolymer should be 20% by weight or more, preferably 30% by weight or more.

The content of the polyetherester hard segment (X, Y) in the total weight of the polyetherester block copolymer should be within the range of 30 through 80% by weight, preferably 40 through 70% by weight. The polyester hard segment should contain, as an essential constituent, the polybutylene terephthalate unit (X) and can contain, as an optional constituent, the other ester unit (Y). The butylene terephthalate hard segment, by which the cutting resistance of the golf ball is ensured, should be contained in an amount of 30% by weight or more, preferably 40% by weight of more.

Furthermore, in order to obtain the desired golf ball having good hitting feeling near to that obtained by the use of balata as an outer cover, the 10% modulus (i.e. the stress at 10% elongation) of the polyetherester block copolymer is preferably 40 through 200 kg/cm$^2$, more preferably 60 through 170 kg/cm$^2$. In order to obtain this range of physical property, the weight ratio of the polyetherester soft segment to the butylene terephthalate hard segment should be 20/80 through 70/30, more preferably 30/70 through 60/40.

As mentioned hereinabove, the polyester hard segment can contain the other ester copolymer unit, in addition to the butylene terephthalate unit. The use of the ester copolymer unit, other than the butylene terephthalate unit, results in the freedom of the design of multi-piece solid type golf balls as to the feeling, the flight performance, the moldability and processability and the economical manufacture of the golf balls, since the ester copolymer unit, other than the butylene terephthalate unit, has the intermediate properties between the butylene terephthalate unit and the polyetherester soft segment. The ester unit other than the butylene terephthalate can be contained in the total polyetherester block copolymer in an amount of 50% by weight or less, preferably 30% by weight or less. Of these ester units other than the butylene terephthalate, the use of the butylene isophthalate unit is especially desirable due to the fact that the block copolymer having the above-mentioned desired characteristics for the golf balls can be obtained.

As illustrated in the triangular diagram of FIG. 1, the composition of the polyetherester block copolymers used in the present invention should be such that the contents of the butylene terephthalate unit (X), the ester unit (Y) other than butylene terephthalate and the polyetherester soft segment unit (Z) in the block copolymer is within the area enclosed by the points A, B and C, preferably the area enclosed by the points A', B' and C'. In the case where the polyetherester block copolymer having a composition other than that of the area enclosed by the points A, B and C is used, the outer cover materials of the multi-piece solid center ball having the desired characteristics of the present invention cannot be obtained.

The compositions of the points A, B, C, A', B' and C' of FIG. 1 are as follows.

| Point | Butylene terephthalate Unit (X) | Other Ester Unit (Y) | Polyetherester Soft Segment Unit (Z) |
|---|---|---|---|
| A | 80 | 0 | 20 |
| B | 30 | 50 | 20 |
| C | 30 | 0 | 70 |
| A' | 70 | 0 | 30 |
| B' | 40 | 30 | 30 |
| C' | 40 | 0 | 60 |

The polyetherester block copolymers used as an outer cover material in the present invention can optionally contain, for example, various stabilizers such as antioxidants, light stabilizers, hydrolytic stabilizers and the like, pigments such as titanium oxide, zinc oxide and the like and other additives. Furthermore, the polyetherester block copolymers used in the present invention can contain softening agents such as plasticizers and the like, reinforcement and stiffness improvement materials such as glass fibers and inorganic fillers, and various polymers to control the hardness of the polyetherester block copolymers or the qualitative feeling when the ball is hit by a club, as long as the above-mentioned characteristics suitable for use as the outer cover of the golf ball are not impaired. Especially when polybutylene terephthalate is blended with the block copolymer, the 10% modulus of the polyetherester block copolymer can be appropriately controlled and the qualitative feeling and the cutting resistance of the ball can be improved without impairing the characteristics of the polyetherester block copolymer, for example, the impact resilience and the impact strength. In addition, since the compatibility of the polyetherester block copolymer with the polybutylene terephthalate is good, neither a decrease in the fusion or melt bonding of the half-cups nor a decrease in the weld strength in the molding of the golf balls occurs. The polybutylene terephthalate can be blended with polyetherester block copolymer in an amount of 50% by weight, preferably 25% by weight or less based on said block copolymer. In the case where the polybutylene terephthalate is blended, the contents of the units X, Y and Z in the total weight of the polyetherester block copolymer composition should be within the area defined in the triangular diagram of FIG. 1.

Accordingly, the term "polyetherester block copolymer" used herein means not only the block copolymer itself in a narrow sense, but also the block copolymer composition containing, for example, the blended polybutylene terephthalate, as long as the contents of the units X, Y and Z are within the area defined in the triangular diagram of FIG. 1.

The solid central core of the golf ball according to the present invention is composed of one or more pieces and the materials used in the formation of the solid central core can be selected from known materials which have the desired characteristics of the multi-piece solid golf balls. Examples of such materials are:

(1) A composition containing (a) polybutadiene having a cis-1,4-bond content of at least 40%, (b) $\alpha,\beta$-ethylenically unsaturated carboxylic acid capable of grafting onto the polybutadiene and having 3 through 8 carbon atoms and (c) a metallic ion having 1 through 3 valences sufficient to neutralize at least 10% of the carboxylic acid;

(2) A composition of (a) the polybutadiene, (b) the $\alpha,\beta$-ethylenically unsaturated carboxylic acid and (c) the metallic ion, all as defined in the above composition (1), and (d) a polyfunctional unsaturated ester.

Among these compositions, the appropriate materials can be readily selected taking into account the desired resilient properties, durability, "click" characteristics and the like.

The multi-piece golf balls of the present invention comprising the polyetherester block copolymer outer cover and the solid central core have advantages in that the specific gravity of the central core materials can be minimized and the impact resilience of the central core itself can be remarkably increased, since the specific gravity of the polyetherester block copolymer is larger than that of the ionomer which is usually used as an outer cover in the conventional two-piece golf balls.

Furthermore, according to the present invention, since, a golf ball can be composed of a solid central core having a modulus higher than that of the known two-piece golf ball and the outer cover having an appropriate modulus, a golf ball having a resilient property higher than that of the conventional two-piece ball and having good "click" characteristics can be obtained. Contrary to this, in the case where the known cover materials are used, golf balls having both good resilient properties and good "click" characteristics cannot be obtained.

The golf balls of the present invention can be manufactured in any conventional manner. For instance, solid central cores are molded by an injection molding, a compression molding, an extrusion molding or any combination thereof. On the other hand, half-cups (or half-shells) of the outer cover are premolded from a composition containing, as a main constituent, the above-mentioned polyetherester block copolymer. Then, the solid central core is covered with the half-cups obtained above, and compression molded to form the desired golf ball. Otherwise, the golf ball can be manufactured by centering the solid central core in a mold and, then, injection molding the outer cover material around the solid central core in the mold.

The present invention is further illustrated in detail by, but is not limited to, the following Examples in which all parts and percentages are expressed on a weight basis, unless otherwise specified.

The golf balls obtained in the Examples below were evaluated as follows.

(1) Flight Distance

The flight distance of the golf ball to be tested was determined by using a golf ball hitting test machine manufactured by TRUE TEMPER CORP., when the ball was hit with a No. 1 wood club under the conditions of the club head speed of 45 m/sec and the ball temperature of 25° C.

(2) Cutting Resistance

The cutting resistance of the golf ball was determined by observing, with the naked eye, the marks caused on the surface of the golf ball after the golf ball was hit with the club edge of a No. 7 iron at a pressure of 7 Kg/cm$^2$. A golf ball hitting test machine manufactured by TRUE TEMPER CORP. was used.

(3) Impact Resistance

The impact resistance of the golf ball was determined by observing, with the naked eye, the crack of the ball and the craze of the cover after the golf ball was hit with a No. 1 wood club under the conditions of the club head speed of 50 m/sec and the ball temperature of 0° C.

(4) Hitting Feeling (Response in the Hands and Click)

An acceleration wave on a putter head caused by putting impact at head speed 2.6 m/s (constant) was determined by using an accelerometer pickup attached to the putter. "Acceleration wave high frequency index" is defined as follows.

A ratio of the amplitude of the high-frequency component in the acceleration wave to the peak acceleration was calculated, and the high-frequency index of each test ball was determined, based on the index of the high-frequency component of the balata cover ball as 100.

When the index of the test ball is nearer to 100, the qualitative feeling of the test ball when the ball is hit with a club is closer to that of the balata cover ball.

EXAMPLE 1

100 parts of cis-1,4-polybutadiene (BR 01 available from Japan Synthetic Rubber Co., Ltd.) was mixed with 35 parts of zinc oxide (ZnO) in a kneader and, then, was thoroughly mixed with 26-30 parts of acrylic acid and 1.2-3.0 parts of dicumyl peroxide. The resultant compound was compression molded under heating to form the vulcanized one-piece solid central core having a diameter of 37.2 mm$\phi$. The central core thus obtained was centrally placed in a mold and each of the polyetherester block copolymers of their compositions A through E was injection molded around the core. Thus, golf balls were obtained. The evaluation results of the golf balls thus obtained are shown in Table 1 below.

Preparation of Polyetherester Block Copolymer 102 parts of dimethyl terephthalate, 34.0 parts of dimethyl isophthalate, 80.3 parts of poly(tetramethylene oxide) glycol and 94.5 parts of 1,4-butanediol were charged, together with 0.10 part of a titanium tetrabutoxid catalyst, to a reaction vessel equipped with a helical ribbon type agitator. Then, the mixture was heated at a temperature of 210° C. for 2 hours, whereby 95% of the theoretical amount of methanol was distilled off from the reaction system. 0.45 parts of "Irganox" 1010 (thermal stabilizer available from Japan Chiba Geigy Corp.) was added to the mixture, and then heated to a temperature of 245° C. The system was then evacuated to a pressure of 0.2 mmHg over 50 minutes and the polymerization reaction was effected for 2 hours under these conditions. The polyetherester block copolymer A thus obtained had a melting point of 164° C. and an inherent viscosity of 1.25.

The polyetherester block copolymer A in the form of pellets and polybutylene terephthalate having an inherent viscosity of 0.85 were melt blended in a 30 mm$\phi$ extruder at a cylinder temperature of 240° C. Thus, the polyetherester block copolymer compositions B and C containing 10% and 20% of polybutylene terephthalate, respectively, were obtained.

Polyetherester block copolymer D having a melting point of 203° C. and an inherent viscosity of 1.20 was prepared by using, as starting materials, 136 parts of dimethyl terephthalate, 80.3 parts of poly(tetramethylene oxide) glycol having a number-average molecular weight of about 1000 and 94.5 parts of 1,4-butanediol in a manner as described in the preparation of the polyetherester block copolymer A. Furthermore, the polyetherester block copolymer D was melt blended with 10% of polybutylene terephthalate having an inherent viscosity of 0.85 to prepare polyetherester block copolymer composition E.

EXAMPLE 2

A solid central core having a diameter of 31.5 mm$\phi$ and containing, as a main constituent, cis-1,4-polybutadiene, zinc oxide (ZnO) and acrylic acid was prepared in a manner as described in Example 1. On the other hand, a mixed compound containing cis-1,4-polybutadiene, zinc oxide, methacrylic acid and dicumyl peroxide was pre-molded into top and bottom half-molds having a diameter of 38.2 mm$\phi$ to form a couple of half-cups having a thickness of 3.5 mm. The central core obtained above, having a diameter of 31.2 mm$\phi$, was placed between the pre-molded half-cups and the resultant assembly was press molded under a pressure of 1000 kg at a temperature of 150° C. for 30 minutes. Thus, the vulcanized two-piece solid central core was obtained.

A three-piece golf ball was prepared, in a manner as described in Example 1, by using as an outer cover, the polyetherester block copolymer E. The evaluation results are shown in Table 1 below.

As comparative examples, the evaluation results of a comparative test sample in which a balata outer cover was used in lieu of the polyetherester block copolymer E and the results of a commercially available golf ball (AD Rextar ®, thread-wound golf ball available from Bridgestone Tire Co., Ltd.) are also shown in Table 1 below.

TABLE 1

| | | Example 1 | | | | | Example 2 | Comparative Test Sample | Comparative Example Commercially Available Ball | |
|---|---|---|---|---|---|---|---|---|---|---|
| | Type | A | B | C | D | E | E | Balata | Ionomer | Balata |
| Cover Material | 10% Modulus (Kg/cm$^2$) | 65 | 83 | 130 | 105 | 160 | 160 | — | | |
| | Resilience (%) | 55.8 | 55.4 | 50.1 | 49.9 | 47.1 | 47.1 | — | | |
| Core | No of Piece | 1 | 1 | 1 | 1 | 1 | 2 | 1 | | |
| | Hardness 100 Kg Load Deflection (mm) | 2.5 | 2.6 | 2.7 | 3.1 | 3.7 | 2.7 | (Solid) | (Solid) | (Thread-wound) |
| | Diameter (mm) | 37.2 | 37.2 | 37.2 | 37.2 | 37.2 | Inner 31.5 Outer 37.5 | | | |
| Ball | Weight (g) | 45.4 | 45.5 | 45.7 | 45.5 | 45.7 | 45.5 | 45.5 | 45.3 | 45.6 |
| | Diameter (mm) | 41.3 | 41.3 | 41.3 | 41.3 | 41.3 | 41.3 | 41.3 | 41.15 | 41.2 |
| Evaluation Result | Flight Distance (m) | 180 | 186 | 199 | 195 | 190 | 194 | 171 | 185 | 195 |
| | Cutting Resistance | O | O | O | O | O | O | O | O | X |
| | Impact Resistance | O | O | O | O | O | O | O | O | O |
| | Hitting Feeling (Response in the Hands and "click") Acceleration Wave High Frequency Index | 136 | 168 | 204 | 207 | 191 | 170 | 95 | 263 | 100 |

We claim:

1. In a solid type golf ball comprising a central core and an outer cover for the core, the improvement wherein the main component of the outer cover is at least one polyetherester block copolymer containing the following X, Y and Z units:

X: Butylene terephthalate unit
Y: Ester unit other than butylene terephthalate
Z: Polyetherester unit derived from a dicarboxylic acid component containing terephthalic acid and poly(alkylene oxide) glycol, having a number average molecular weight of 400 through 3000, wherein the X, Y and Z units are present in the following amounts:

30% by weight $\leq$ X $\leq$ 80% by weight
0% by weight $\leq$ Y $\leq$ 50% by weight
20% by weight $\leq$ Z $\leq$ 70% by weight.

2. A golf ball as claimed in claim 1, wherein the amounts of X, Y and Z units in the polyetherester block copolymer are:

40% by weight $\leq$ X $\leq$ 70% by weight
0% by weight $\leq$ Y $\leq$ 30% by weight
30% by weight $\leq$ Z $\leq$ 60% by weight.

3. A golf ball as claimed in claim 1, wherein said polyetherester block copolymer has a stress at 10% elongation of 40 through 200 Kg/cm$^2$.

4. A solid type golf ball comprising a central core and an outer cover for the core, wherein the main component of the outer cover is at least one polyetherester block copolymer containing the following X, Y and Z units:

X: Butylene terephthalate unit
Y: Ester unit other than butylene terephthalate
Z: Polyetherester unit derived from a dicarboxylic acid component containing terephthalic acid and poly(alkylene oxide) glycol, having a number average molecular weight of 400 through 3000, wherein the X, Y and Z units are present in the following amounts:

30% by weight $\leq$ X $\leq$ 80% by weight
0% by weight $\leq$ Y $\leq$ 50% by weight
20% by weight $\leq$ Z $\leq$ 70% by weight.

* * * * *

UNITED STATES PATENT AND TRADEMARK OFFICE
CERTIFICATE OF CORRECTION

PATENT NO. : 4,398,000
DATED : August 9, 1983
INVENTOR(S) : N. Kataoka; T. Saito; T. Matsunaga; C. Tanaka; Y. Furuta and N. Naito It is certified that error appears in the above-identified patent and that said Letters Patent is hereby corrected as shown below:

Column 1, line 50, after "above-mentioned" insert --structure--.

Column 1, line 50, delete "becomes" and insert --become--.

Column 2, line 25, delete "AB, BC and CA" and insert --$\overline{AB}$, $\overline{BC}$ and $\overline{CA}$--.

Column 2, line 25, delete "A'B', B'C' and C'A'" and insert --$\overline{A'B'}$, $\overline{B'C'}$ and $\overline{C'A'}$--

Column 2, line 37, delete "CA" and insert --$\overline{CA}$--.

Table I, under "Type" heading, line 3, delete "Piece" and insert --Pieces--.

Column 9, line 9, after "1" insert --or 4--.

Column 9, line 15, after "1" insert --or 4--.

Signed and Sealed this

Twenty-fourth Day of January 1984

[SEAL]

Attest:

GERALD J. MOSSINGHOFF

Attesting Officer     Commissioner of Patents and Trademarks